United States Patent
Sichner et al.

(10) Patent No.: US 8,203,980 B2
(45) Date of Patent: *Jun. 19, 2012

(54) INDUSTRIAL ETHERNET COMMUNICATIONS ADAPTER

(75) Inventors: Gregg M. Sichner, Mentor, OH (US); David S. Wehrle, Chesterfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/724,616

(22) Filed: Mar. 16, 2010

(65) Prior Publication Data

US 2010/0172372 A1    Jul. 8, 2010

Related U.S. Application Data

(63) Continuation of application No. 11/537,010, filed on Sep. 29, 2006, now Pat. No. 7,719,961.

(51) Int. Cl.
- *H04B 3/30* (2006.01)
- *H04L 12/28* (2006.01)
- *G06F 13/36* (2006.01)
- *G06F 3/00* (2006.01)
- *G06F 3/048* (2006.01)

(52) U.S. Cl. ........ 370/285; 370/400; 370/402; 710/306; 710/311; 715/733; 715/764

(58) Field of Classification Search ............... 370/285, 370/400, 402; 710/306, 311; 715/733, 764
See application file for complete search history.

(56) References Cited

U.S. PATENT DOCUMENTS

| | | | |
|---|---|---|---|
| 6,236,334 B1 | 5/2001 | Tapperson et al. | |
| 6,412,032 B1 * | 6/2002 | Neet et al. | 710/52 |
| 6,463,338 B1 | 10/2002 | Neet | |
| 6,654,865 B2 | 11/2003 | Hudson | |
| 6,662,247 B1 | 12/2003 | Ales et al. | |
| 6,973,508 B2 | 12/2005 | Shepard et al. | |
| 7,080,150 B1 | 7/2006 | Wehrle et al. | |
| 7,085,841 B2 | 8/2006 | Edwards et al. | |
| 7,107,358 B2 | 9/2006 | Vasko et al. | |
| 7,184,396 B1 | 2/2007 | Li | |
| 2003/0051074 A1 | 3/2003 | Edwards | |
| 2004/0230323 A1 * | 11/2004 | Glanzer et al. | 700/18 |
| 2005/0103767 A1 | 5/2005 | Kainec et al. | |
| 2005/0129097 A1 * | 6/2005 | Strumpf et al. | 375/219 |
| 2005/0185595 A1 | 8/2005 | Lee | |
| 2006/0025872 A1 | 2/2006 | Glanzer et al. | |
| 2006/0031488 A1 | 2/2006 | Swales | |
| 2006/0133412 A1 | 6/2006 | Callaghan | |
| 2006/0190112 A1 | 8/2006 | Buesgen et al. | |
| 2006/0212163 A1 | 9/2006 | Ko et al. | |
| 2007/0067725 A1 * | 3/2007 | Cahill et al. | 715/733 |
| 2007/0240071 A1 * | 10/2007 | Sherrill et al. | 715/764 |

* cited by examiner

*Primary Examiner* — Brandon Renner

(74) *Attorney, Agent, or Firm* — Fay Sharpe LLP; R. Scott Speroff; John M. Miller

(57) ABSTRACT

Communications adapters and methods are provided for interfacing communications for an EtherNet/Ip or other general purpose industrial network, a Fieldbus or other open protocol device network, and a PointBus or other proprietary network. The adapter may be integrated in a module of a backplane system with connections to the general purpose, proprietary, and open protocol device networks, and provides a bridging for communications across the networks to make devices on the proprietary and open protocol networks accessible as if they were on a single device network and with sequential addressing capabilities.

23 Claims, 8 Drawing Sheets

INDUSTRIAL ETHERNET COMMUNICATIONS ADAPTER

REFERENCE TO RELATED APPLICATION

This application is a continuation of, and claims priority to and the benefit of U.S. patent application Ser. No. 11/537,010, now U.S. Pat. No. 7,719,961, filed Sep. 29, 2006, entitled "INDUSTRIAL ETHERNET COMMUNICATIONS ADAPTER", the entirety of which is hereby incorporated by reference.

FIELD OF THE INVENTION

The present invention relates generally to industrial control systems and more particularly to communication adaptation bridging industrial EtherNet networks with industrial control systems.

INCORPORATION BY REFERENCE

U.S. Pat. No. 7,080,150 to Wehrle et al., filed Apr. 10, 2000, entitled POINTBUS ARCHITECTURE AND AUTOMATIC SEQUENTIAL ADDRESSING PROTOCOL is hereby incorporated by reference as if fully set forth herein.

BACKGROUND OF THE INVENTION

Industrial control systems or controllers are employed for controlling operation of a wide variety of systems, including processes, machines, etc., and are typically adaptable to different control applications through configuration and interconnection of multiple control system components or devices, such as control modules, I/O modules, I/O devices, etc. Modern industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are more and more being interconnected with management information and other systems in a manufacturing facility and may be operatively connected to any number of communications networks to facilitate various business management functions such as inventory control, accounting, manufacturing control, etc., in addition to the process/machine control functionality. A continuing goal is thus to allow users throughout a given enterprise to access manufacturing data from any location, at any time, and to integrate this data seamlessly with business information systems. In the past, however, this integration of business and control systems has required extensive network bridging as business systems have generally been constructed using EtherNet or other general purpose communications networks, whereas specialized networks have been utilized for networked control system components.

The desire to integrate the business and control network structures to interconnect industrial control systems with general purpose systems has led to introduction of industrial EtherNet networks, such as EtherNet/IP networks that have attained some amount of success in allowing direct connection of field devices to an EtherNet network. However, many types of field devices, such as specialized sensors and other low volume devices are not currently offered with industrial EtherNet communications capabilities. Furthermore, the cost for incorporating EtherNet communications functionality is prohibitive for low cost sensors, whereby even if EtherNet/IP compliant devices are available, these are generally more costly than equivalent Fieldbus devices. As a result, constructing a system using exclusively EtherNet/IP devices may be impractical. Thus, while certain EtherNet/IP capable field devices are slowly being introduced, many commercially available Fieldbus compliant devices, such as actuators, motors, valves, etc. remain more cost-effective although not adapted to communicate directly on industrial EtherNet networks. These field devices typically provide communication using device networks including conventional industrial Field bus networks. Currently, such Field bus-ready devices are widely available and are often the most cost effective choice for a variety of control applications. In order to connect such Fieldbus devices to industrial EtherNet networks, therefore, linking devices are needed, such as DeviceNet-to-EtherNet/IP bridges. However, such connections occupy an EtherNet network node and add to system configuration and maintenance complexity. Thus, there remains a need for improved apparatus and methods for cost-effective connection of new and existing control systems to EtherNet and other general purpose networks that allow the use of widely available lower cost Fieldbus adapted devices.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention relates to communications adapters and methods that allow simple interconnection of field devices operative for Fieldbus or other open protocol network communications with EtherNet-based or other general purpose networks without the cost or complexity of prior linking devices and which allow module address consolidation and sequential module/device addressing within a single primary network node. In one embodiment, a rack or backplane network-based adapter is provided as a module which can be connected to the proprietary backplane bus and which provides connections and a bridging system for communications interfacing between a general purpose industrial network, a Fieldbus or other open protocol device network, and a PointBus or other proprietary network. The adapter thus allows connection of a number of field devices and backplane modules to a single node on the general purpose network, thereby saving primary network node addresses in an enterprise-wide system, while allowing a user to interact with the modules and field devices as if they were on a single network. The invention thus facilitates cost-effective enterprise-wide communications integration using existing network and field devices without requiring the use of field devices that are EtherNet/IP ready.

One or more aspects of the invention relate to a communications adapter for an industrial control system, where the adapter includes connections for communicating with a general purpose industrial network, one or more devices on the second network, and one or more devices on an open architecture third network, as well as a bridging system that provides communications bridging for the general purpose industrial network, the second network, and the third network. The general purpose industrial network can be of any type, for example, a ControlNet network, an industrial EtherNet network such as EtherNet/IP, etc. The second network can be a proprietary protocol network such as PointIO (Point- Bus) used for communicating with I/O modules connected to a backplane bus, and the communications adapter can itself be integrated in a module coupled with the backplane. The second network, moreover, may allow sequential addressing for devices thereon, and the bridging system can provide sequential addressing for devices on the second and third networks so that module/device addresses can be economized with an end user interacting with the modules and devices of the second and third networks as if they were on a single network connected to a single general purpose network node address. The third network can be any Fieldbus or other type of open architecture network, such as DeviceNet in one embodiment, whereby existing field devices can be used without added cost for individual device EtherNet/IP capabilities. This allows operative enterprise interconnection to proceed in existing installations having large numbers of Fieldbus devices, and also allows devices selection from the wide array of currently available and less expensive Fieldbus-compatible devices for cost effective construction of new manufacturing systems, whereby ODVA-compatible devices and Fieldbus device networks can be used extensively with connection thereof to the adapter modules for bridging along with the backplane modules to the industrial EtherNet.

Other aspects of the invention relate to a communications module for interfacing at least one I/O module of a backplane I/O system and at least one device on an open architecture network with an industrial EtherNet network. The module includes a backplane connection for connection to a proprietary architecture backplane network, as well as an industrial EtherNet network connection for connection with an industrial EtherNet network and an open architecture device network connection for communicating with one or more devices on the open architecture device network, such as a Fieldbus. A bridging system is provided in the module to provide communications bridging for the backplane network, the industrial EtherNet network, and the open architecture device network, and the bridging system may also provide for sequential addressing.

Further aspects of the invention provide a backplane I/O system that is comprised of a proprietary architecture backplane network, one or more I/O modules coupled with the backplane network, and a communications module having connections to the backplane network, an industrial EtherNet network connection, and an open architecture device network, as well as a bridging system providing communications bridging for the backplane network, the industrial EtherNet network, and the open architecture device network.

Still other aspects of the invention involve a method for consolidating device addresses in an industrial EtherNet network. The method includes coupling a communications adapter with a proprietary protocol network, an open architecture network, and an industrial EtherNet network, and interfacing devices on a proprietary protocol network and an open architecture network with an industrial EtherNet network using the communications adapter. The method may further provide sequential addressing for devices on the proprietary protocol and open architecture networks, where the proprietary protocol network and the open architecture network form a single network node in the industrial EtherNet network. In addition, the method may include the adapter receiving a packet from the industrial EtherNet network packet that includes first data for a first device coupled with the proprietary protocol network or the open architecture network, and second data for a second device coupled with the proprietary protocol network or the open architecture network, with the adapter disassembling the EtherNet packet and providing the first data to the first device and providing the second data to the second device. Moreover, the method may provide for constructing a single industrial Ethernet network packet that includes data obtained from more than one of the devices connected to the proprietary protocol network and/or open architecture networks.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention are set forth in the following detailed description of the invention when considered in conjunction with the drawings, in which.

DETAILED DESCRIPTION OF THE INVENTION

Figure 1:
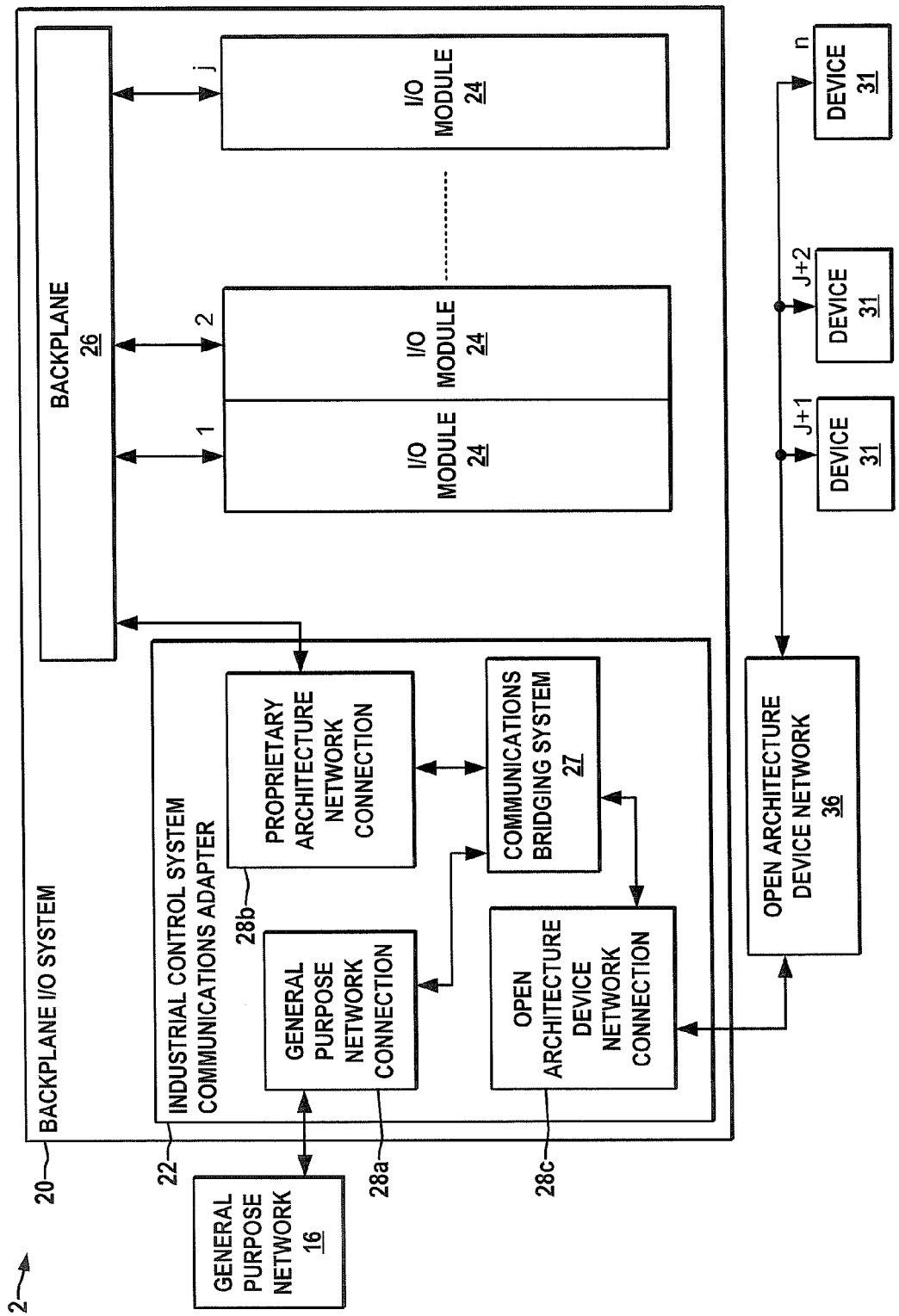
FIG. 1 is a system diagram illustrating an exemplary communications adapter for bridging communications between a general purpose network, a proprietary network, and an open architecture network in an industrial control system according to one or more aspects of the present invention.

Referring now to the figures, several embodiments or implementations of the present invention are hereinafter described in conjunction with the drawings, wherein like reference numerals are used to refer to like elements throughout, and wherein the various features are not necessarily drawn to scale. The invention provides methods and apparatus that can be advantageously employed in the communicative interconnection of two or more different control system networks with a general purpose network to facilitate communications with control or I/O modules and field devices on the control networks using a single general purpose network node address, with a user being able to access the device and modules as if they were on a single network. The invention is hereinafter illustrated and described in conjunction with certain specific embodiments, although it will be appreciated that the invention is broadly applicable to a wide variety of applications and network types in which control system components and business or other enterprise systems are to be networked together, and the invention is not limited to the exemplary implementations set forth herein.

Referring initially to FIG. 1, a control system 2 is illustrated with a backplane I/O system 20 having an industrial control system communications adapter 22 as well as an integer number "j" I/O modules communicating with a proprietary backplane bus network 26. The system 2 may be configured for controlling and/or monitoring one or more processes, machines, or other controlled system(s) (not shown), and can include other elements or components that communicate with the I/O system 20 via a general purpose network 16 and/or via an open architecture device network 36 for exchanging data, messages, etc. For instance, one or more field devices 31 may be operatively coupled with the device network 36 including input sensors, output actuators, etc., and one or more control modules, computers, or other systems or components may be coupled with the general purpose network 16, which can communicate with the I/O modules 24 of the system 20 and with the devices 31 on the device network 36 for implementing a particular control system operation. The I/O system 20 can be of any form that has at least one control system component (e.g., I/O module(s), control module(s), etc.) communicatively coupled with a proprietary network 26, such as a PointIO system with a backplane type bus network 26a as described in the embodiment of FIG. 2 below, a Profibus system, etc.

In accordance with one or more aspects of the invention, the communications adapter 22 provides communications bridging for the backplane network 26, the general purpose network 16, and the device network 36, where the adapter 22 may be a separate component or may be integrated in a module coupled with the PointBus backplane 26. The adapter 22 includes communications connections 28 for these networks, where the connections 28 can be physical electrical connections with suitable interface circuitry as is known, wireless communications links, or any other connection that provide communicative interconnection of the adapter 22 with the networks 16, 26, and 36. As shown in FIG. 1, the communications adapter includes a first connection 28a operatively coupleable to the general purpose network 16, a second connection 28b operatively coupleable to the network 26 for communicating with at least one of the devices 24 thereon, and a third connection 28c operatively coupleable to the device network 36. The adapter 22 further comprises a communications bridging system 27 operatively coupled with the connections 28 that provides communications bridging for the general purpose network 16, the proprietary network 26, and the device network 36. The general purpose network can be any communications network such as a ControlNet network, etc., or can be an industrial EtherNet network including but not limited to an EtherNet/IP network (CIP, IEC 61158 and IEC 61784, and ODVA EtherNet/IP standard), a Modbus-TCP network (IEC 61158, IEC 61784), a PROFINET IO network (IEC 61158 and IEC 61784), a Foundation Fieldbus High Speed EtherNet (HSE) network, an EtherNet Powerlink network (EPSG, EtherNet Powerlink Standardization Group), and an EtherCAT network (IEC/PAS 62407, IEC 61784-3, ISO 15745-4). The adapter 22, moreover, provides communications linking for any type of open-architecture or open-protocol device network 36 to communicating with the device 31 coupled therewith, including but not limited to Fieldbus networks such as Foundation Fieldbus H1 and HSE networks (IEC-61158-2, ISA S50.2, IEEE 802.3u, ISO/IEC 8801-3), Profibus DP, PA, and FMS networks (EN50170, DIN 19245 p3, IEC-61158-2, DIN 19245 p4, EN 13321/1, DIN 19245); DeviceNet networks (ISO 11898, ISO 11519); AS-i networks (IEC-62026-2, EN50295, IEC947); Modbus (EN 1434-3, IEC870-5), HART networks, etc. In addition, the proprietary second network 26 may provide sequential addressing capabilities for the devices 24 thereon, wherein the bridging system 27 in certain embodiments provides sequential addressing for devices 24, 31 on the proprietary and open-architecture networks 26 and 36.

Figure 2:
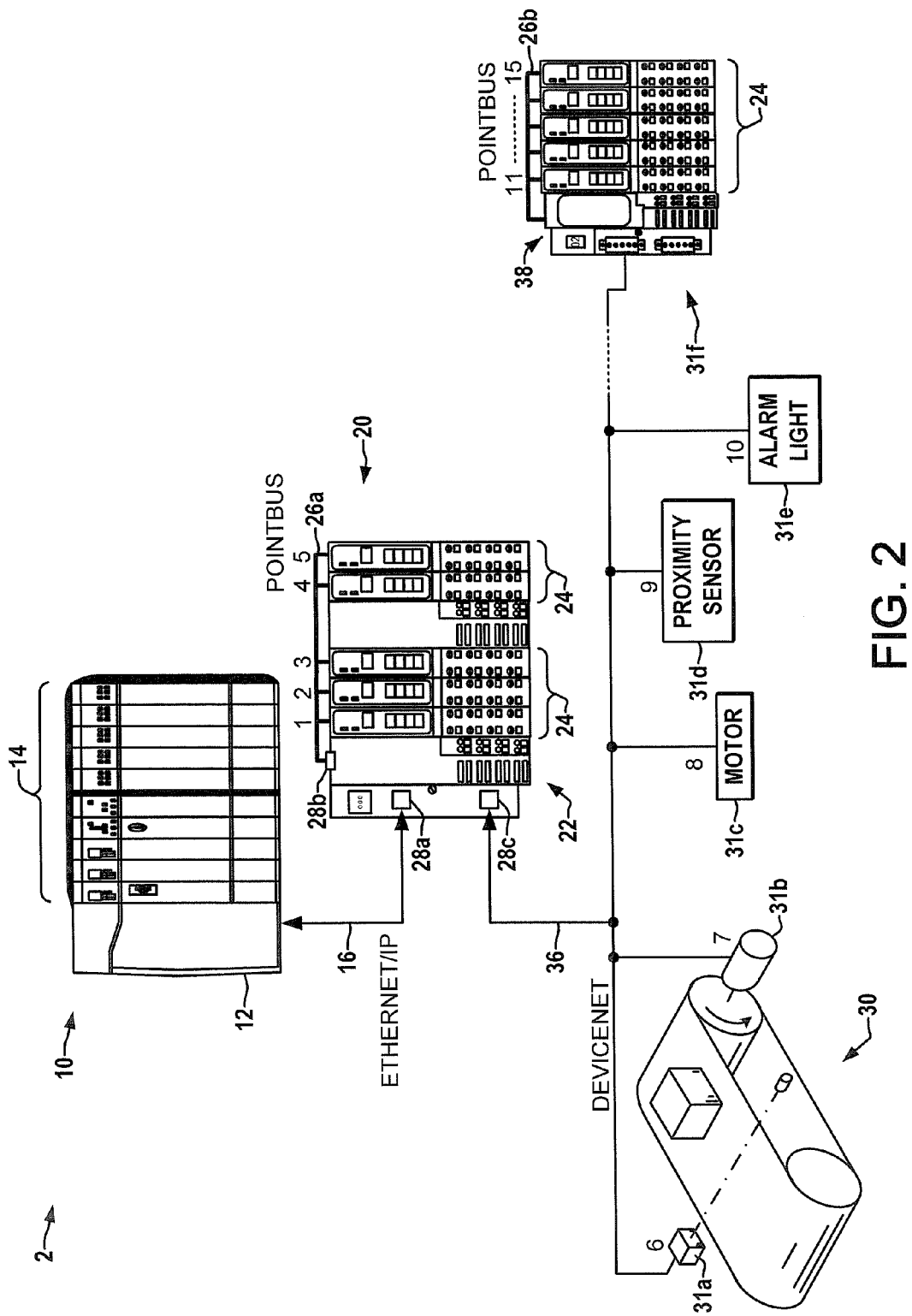
FIG. 2 is a system diagram illustrating one embodiment of an industrial control system with a PointIO system having I/O modules on a proprietary backplane network and a communications adapter connected to a PointBus backplane, as well as an EtherNet/IP network bridged to the backplane network and to an open architecture DeviceNet network via the communications adapter module.
Figure 3:
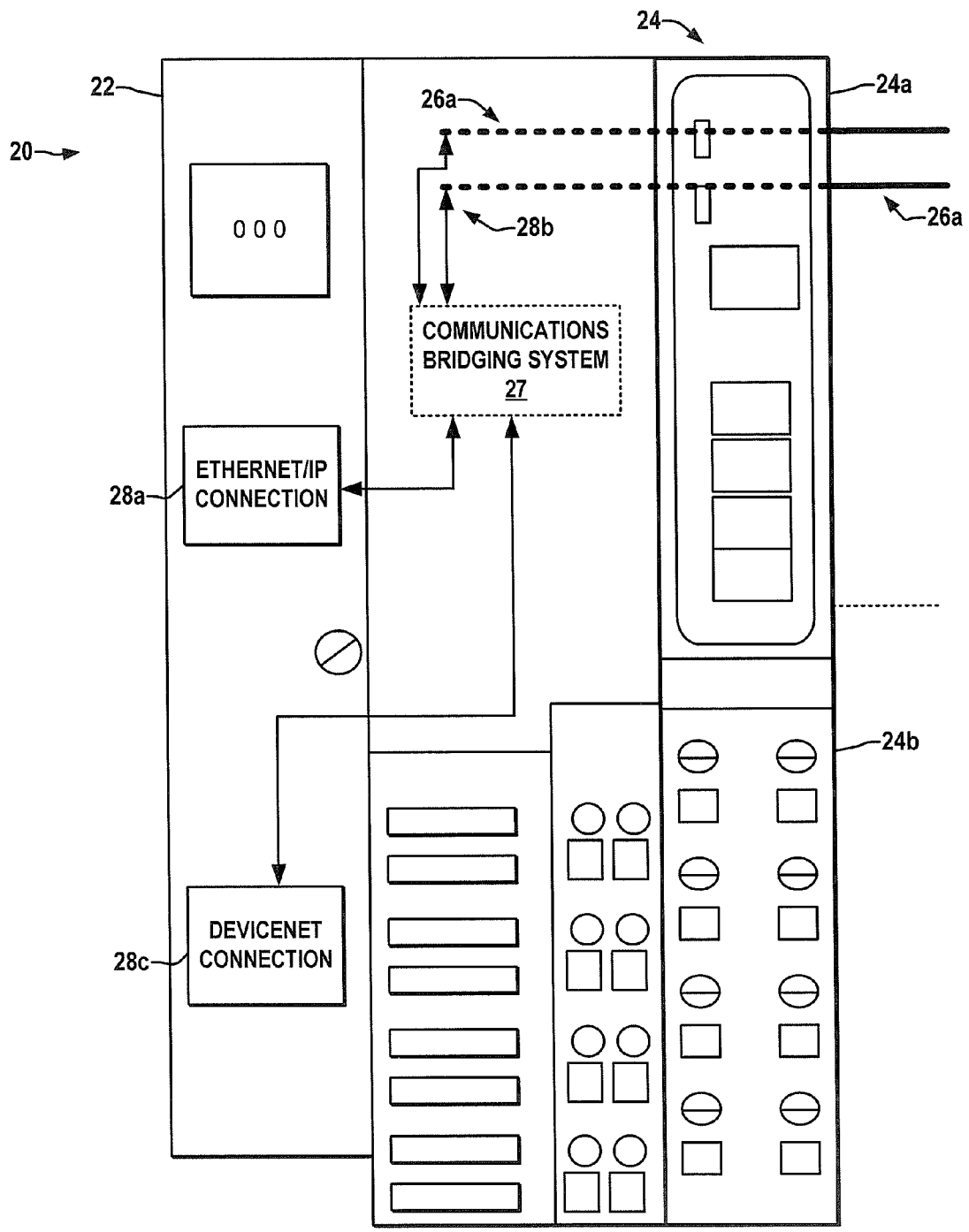
FIG. 3 is a front elevation view illustrating further details of the exemplary communications adapter module of FIG. 2.

Referring now to FIGS. 2 and 3, an exemplary embodiment of the industrial control system 2 is illustrated with a PointIO system 20 having I/O modules 24 on a proprietary PointBus backplane network 26a and a communications adapter module 22 connected to the PointBus backplane 26a, as well as an EtherNet/IP network 16 for communications with a main controller 10 having one or more control modules 14 mounted in a system rack 12. The EtherNet/IP network 16 is bridged to the backplane network 26a and to an open architecture DeviceNet network 36 via the communications adapter module 22, with FIG. 3 showing further details of the exemplary communications adapter module 22. In this embodiment, the PointIO system 20 includes modules 24 having interconnecting signal carrying structures that form a unitary PointBus backplane type network 26a, with each module providing a section of the network 26a, wherein interconnection of further modules or adapters extends the bus 26a to accommodate several modules in a single system 20. As shown in FIG. 3, moreover, the communications adapter module 22 includes electrical connections 28b for coupling the bridging system 27 to the bus network 26a, thereby allowing communication between the bridging system 27 and one or more I/O modules 24 via the backplane bus network 26a. The I/O modules 24 themselves are comprised of an I/O module component 24a and a terminal block component 24b that can be detached and reconnected to the system 20 for ease of wiring and maintenance. The I/O module 24 may itself be detachable from the system 20 generally, allowing repositioning, replacement, etc. of the modules 24 and the components thereof. In this implementation, moreover, the communications adapter module 22 may include one or more terminal blocks.

In the example of FIG. 2, the first PointIO system 20 may be provided proximate a first controlled machine or system with suitable connections between the controlled apparatus and the terminal blocks of the I/O modules 24. Another part of the industrial plant may include a conveyor system 30 with a first field device 31a (e.g., a DeviceNet enabled photo detector device) providing a discrete output indicating the presence or absence of a workpiece traveling along the conveyor, as well as a DeviceNet conveyor drive motor 31b, with both the detector 31a and the motor drive 31b being operatively coupled to the open-architecture network 36. In the illustrated example, further ODVA compliant field devices 31c-31e are also connected to the DeviceNet 36, including a second motor 31c, a proximity sensor 31d, and an alarm light 31e. In addition, a second PointIO sub system 31f is provided with a DeviceNet to PointBus communications adapter module 38, including four additional PointIO modules 24 communicating with the adapter 38 via a second PointBus network 26b.

The PointIO networks 26a and 26b are proprietary protocol/architecture networks with support for DeviceNet messaging and additional services including sequential addressing which is implemented with modules 24 being assigned module addresses on the networks 26a and 26b one at a time using interconnected signals between adjacent modules 24 as shown and described in Wehrle et al. U.S. Pat. No. 7,080,150 incorporated herein by reference. In the embodiment of FIGS. 2 and 3, moreover, the bridging system 27 of the adapter module 22 provides sequential addressing collectively for devices 24, 31 on the networks 26a and 36, and sequential addressing for the modules 24 on the second PointBus network 26b of the second PointIO system 31f operatively coupled to the DeviceNet network 36, for a total of up to 63 modules with discrete addresses on a single network node of the general purpose EtherNet/IP network 16. In this exemplary configuration, the modules 24 on the proprietary networks 26a and 26b of the first and second PointIO systems 20 and 31f are effectively accessible through the general purpose network 16 as if they were on a single network along with the devices 31 on the DeviceNet network 36, and the bridging system 27 of the adapter 22 provides sequential addressing for all the devices on the networks 26 and 36, including the modules 24 of the secondary PointIO system 31f. In this respect, the example shows essentially two different network types coupled to the adapter 22, with the different networks providing different addressing mechanisms.

Figure 4:
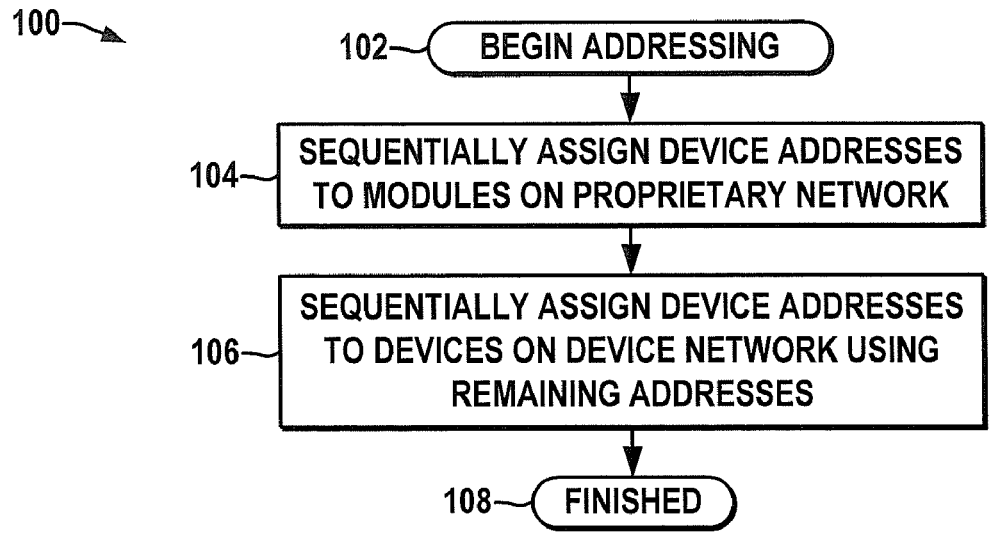
FIG. 4 is a flow diagram illustrating collective sequential address assignment for backplane modules and field devices in the system of FIGS. 2 and 3.
Figure 5:
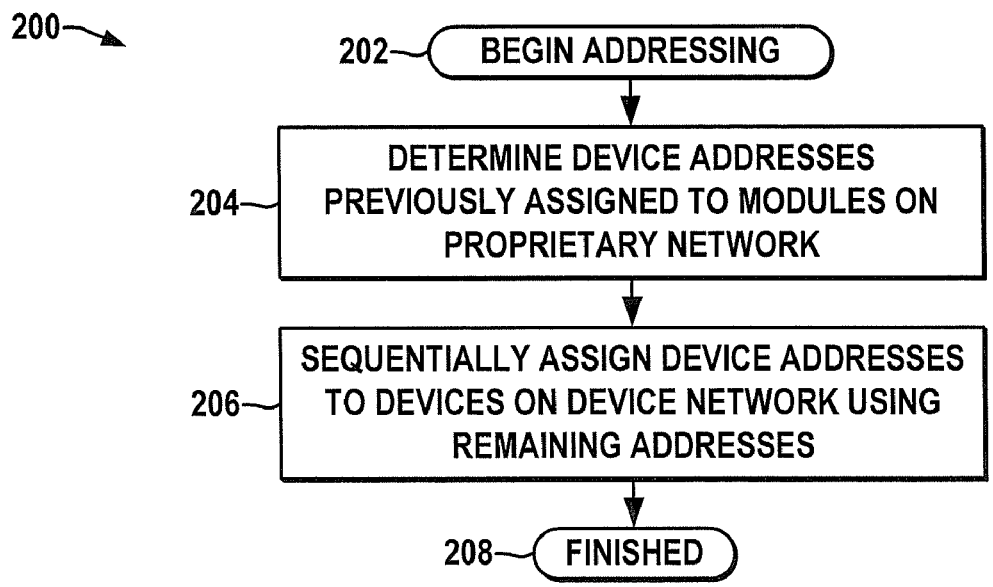
FIG. 5 is a flow diagram illustrating sequential address assignment by the communications adapter module of FIGS. 2 and 3 for Fieldbus devices on the open architecture network in FIG. 2 using available module/device addresses following assessment of the previously used addresses of the PointBus I/O system.

Referring also to FIGS. 4 and 5, the communications adapter 22 can implement sequential addressing of the modules 22 and field devices 31 for initial address assignment using a process 100 (FIG. 4) and may thereafter sequentially address field devices 31 and/or secondary PointIO modules 24 in system 31f by initially ascertaining the next available sequential address based on previously addressed backplane modules 24 of system 20 (FIG. 5). As shown in the process 100 of FIG. 4, the sequential addressing begins at 102 with the adapter 22 initiating sequential auto addressing at 104 as described in Wehrle et al. U.S. Pat. No. 7,080,150 for the modules 24 on the proprietary network 26a. In the illustrated implementation, the sequential addressing is implemented at 104 on the PointBus network 26a of the system 20 via a sequential automatic addressing service of the proprietary PointBus protocol, with the service being initiated by the adapter module 22 providing a start address for the first module 24. This service may be initiated by the module 22 upon system power up, or may be requested by user commands. Once initiated, the first module 24 passes its address to the second module 24, which then increments the address by one and passes the incremented value (its own address) to the next module 24, and the process continues until each module 24 on the bus 26a has been assigned an address. Once this addressing is completed at 104, the bridging system 27 of the adapter 22 sends appropriate commands/messages to the devices 31 on the expansion bus 36, in this case using DeviceNet protocol messaging, to sequentially assign module/device addresses to the devices 31a-31e beginning with the next unused address after the last address of the modules 24 in the first rack 20. In this example, the DeviceNet Fieldbus protocol does not provide for auto addressing, wherein the communications adapter 22 and the bridging system 27 thereof is operative to generate individual address assignment messages for each field device 31a-31e. Thereafter, the device addressing at 106 continues with the adapter 22 sending suitable DeviceNet address messaging to the adapter 38 in the second PointIO system 31f, which messaging includes the value of the next unassigned module address for the collective system. The adapter 38 of the second PointIO system 31f then initiates an auto addressing service using this address value, by which the modules 24 on the network 26b are sequentially addressed, and the processes is finished at 108.

Referring to FIG. 5, the adapter 22 is operable to initiate new module address assignments on the network 26a and/or to ascertain the number of modules 24 on the PointBus network 26a and hence the last module address used on the network 26a, and can then perform address assignment sequentially for the devices 31 on the extension DeviceNet network 36, including addressing for modules 24 on the secondary PointIO bus 26b. The collective sequential addressing 200 of FIG. 5 may be implemented at any time, such as when a new field device 31 is added to the extension network 36. Beginning at 202 in FIG. 5, the adapter module 22 determines the previously assigned device/module addresses at 204 (e.g. or otherwise ascertains the next available address), and then sequentially assigns device addresses for the Fieldbus devices 31a-31e at 206 using appropriate messaging such that the addresses for these device 31a-31e proceed sequentially after the addresses of the modules 24 on the proprietary network 26a. Thereafter the address assignment continues with the adapter 22 instructing the adapter 38 of the subsystem 31f to perform its own auto addressing beginning with the next unused address, whereby the process completes at 208 with the modules 24 on the network 26a, the devices on network 36, and the modules on the network 26b being collectively sequentially addressed. As shown in FIG. 2, once the addressing has been completed, the module/device addresses thus assigned in the system 2 include addresses 1-5 for the modules 24 of the first PointIO system 20, followed by addresses 6-10 for the ODVA compliant Fieldbus devices 31a-31e, with the modules 24 of the secondary PointIO system 31f occupying addresses 11-15. In this manner, the use of sequential addressing utilizes the module addresses efficiently and thus facilitates consolidation of device addresses used, wherein up to 63 such addresses may be assigned in the exemplary system 2 of FIG. 2 accessible via a single network node of the industrial EtherNet network 16.

Referring now to FIGS. 6A-7B, the provision of an adapter module as exemplified in the above description and drawings facilitates the consolidation of network addresses and also allows optimization of the number of connections on a general purpose industrial network, wherein the communications adapter 22 occupies only a single address or node on the general purpose network 16, and requires only a single connection. Furthermore, the adapter facilitates reduction in network traffic by allowing the exchange of data to or from a multitude of separate field devices 31 and/or modules 24 across the general purpose network 16 using a small number of packets, or even a single network message or packet. For instance, in an industrial EtherNet network, two communicating parties must maintain clocks to verify a communicative connection is still valid. As a result, each such connection on the general purpose network 16 requires maintenance of clocks by both parties, and adding large numbers of EtherNet/IP field devices to such a network greatly increases the number of clocks and other connection overhead and resources within the communicating devices. In addition, data reporting by N such field devices on the general purpose network 16 involves N messages or packets, each of which may only include a small amount of data, and thus network traffic increases and efficiency, data latency, and throughput may suffer. The communications adapter 22, on the other hand, can assemble data from a large number of modules 24 and/or field devices 31 into a single packet for transmission on the general purpose network 16, and thus economize the network bandwidth required to send device/module data while using only a single general network connection. Moreover, a single general purpose network packet can be received by the adapter 22 (using a single connection), which includes data for a large number of different devices 13 and/or modules 24, with the adapter disassembling this general purpose network packet and constructing messages or packets for sending the corresponding pieces of data to the appropriate devices 31 or modules 24 across the open network 36 and/or the proprietary network 26. In one illustrative example of the connection/bandwidth economization possible with the invention, a general purpose Ethernet network may be operable to transfer data within individual network packets of 1 Kbyte or more, wherein open architecture fieldbus network packets may be limited to a few bytes (e.g., 8 byte packets in one example). If a large number of modules 24/devices 31 on a PointBus backplane network 26 and DeviceNet open network 36 each produce a single byte of data in a given period, the communications adapter 22 can assemble the data from more than 1,000 such modules/field devices and send all this data in a single packet on the general purpose network 16.

Figure 6A:
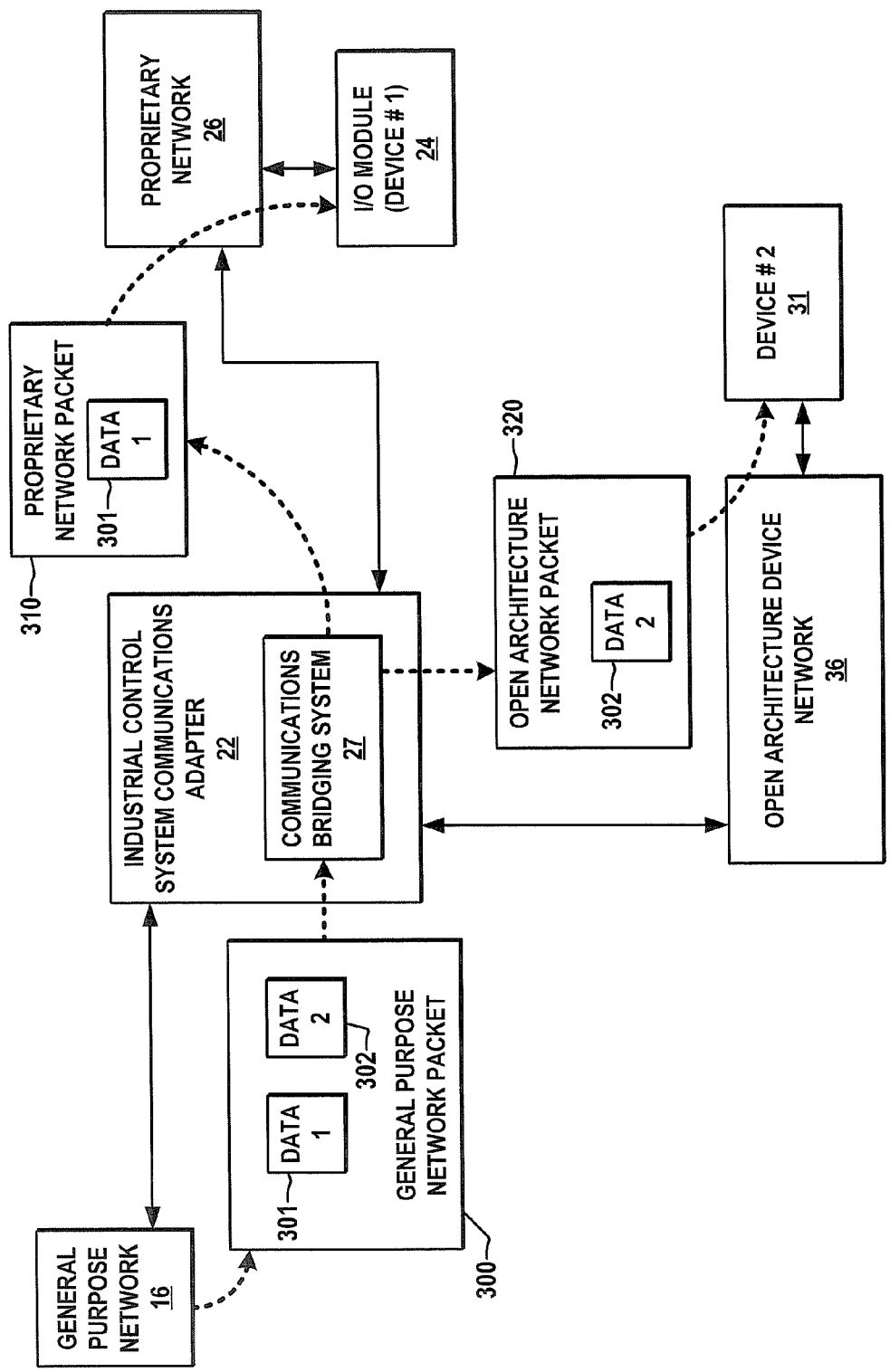
FIG. 6A is a system diagram illustrating operation of the exemplary industrial control system of FIG. 1 with a communications adapter receiving a single packet from the general purpose network and disassembling the packet to create proprietary and open architecture network packets including device specific data from the single general purpose network packet.
Figure 6B:
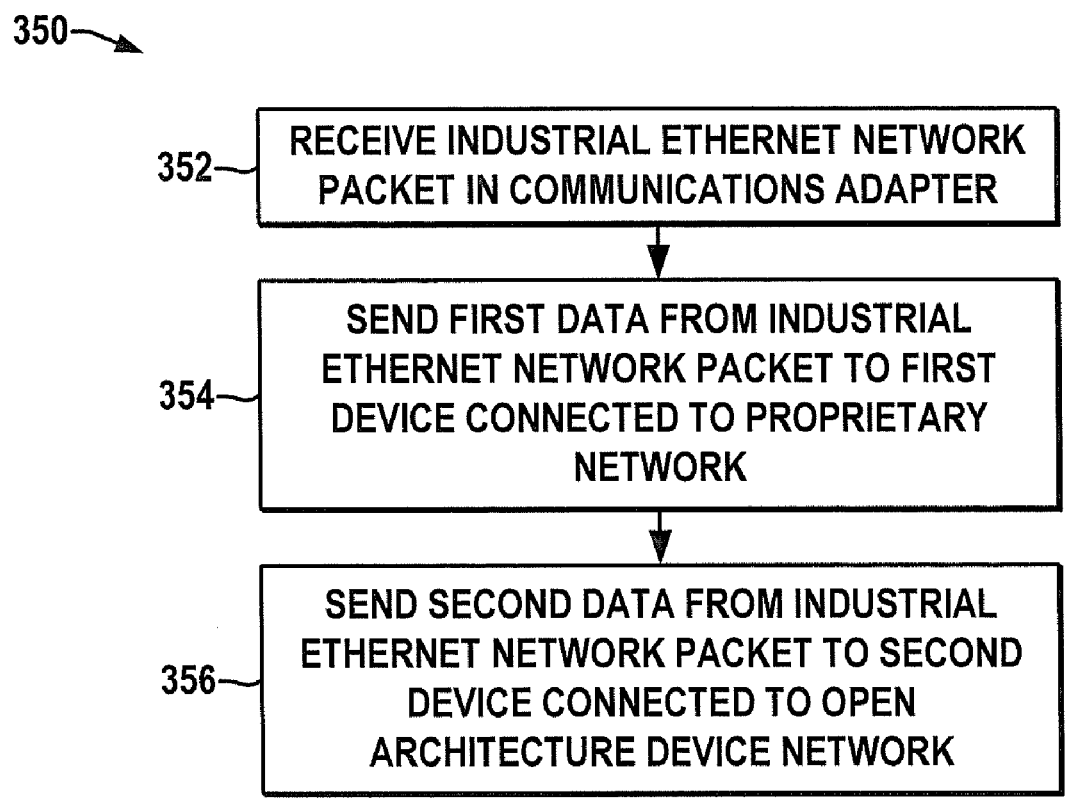
FIG. 6B is a flow diagram illustrating packet disassembly and data distribution by the communications adapter module of FIG. 6A.

FIGS. 6A and 6B illustrate the parsing of a single general network packet 300 by the communications adapter 22 in the exemplary industrial control system 2 in the case where the packet 300 includes first data 301 for a first device or module 24 coupled with the proprietary protocol network 26, as well as second data 302 for a second device 31 coupled with the open architecture network 36. In this instance, the adapter 22 receives the general purpose network packet 300 and constructs suitable proprietary and open architecture network packets 310 and 320, respectively, and sends the first data 301 in the proprietary packet 310 to the module 24 via the network 26, and sends the second data 302 in the packet 320 via the open network 36 to the second device 31. The data 301 and 302 can include values, commands, messages, or other information. FIG. 6B further illustrates this packet disassembly and data distribution by the adapter 22, which operates according to the flow diagram 350 to receive the packet 300 at 352. The adapter 22 then sends the first data 301 from the packet 300 to the first device (module 24) connected to the proprietary network 26 at 354, and sends the second data 302 at 356 to the second device 31.

Figure 7A:
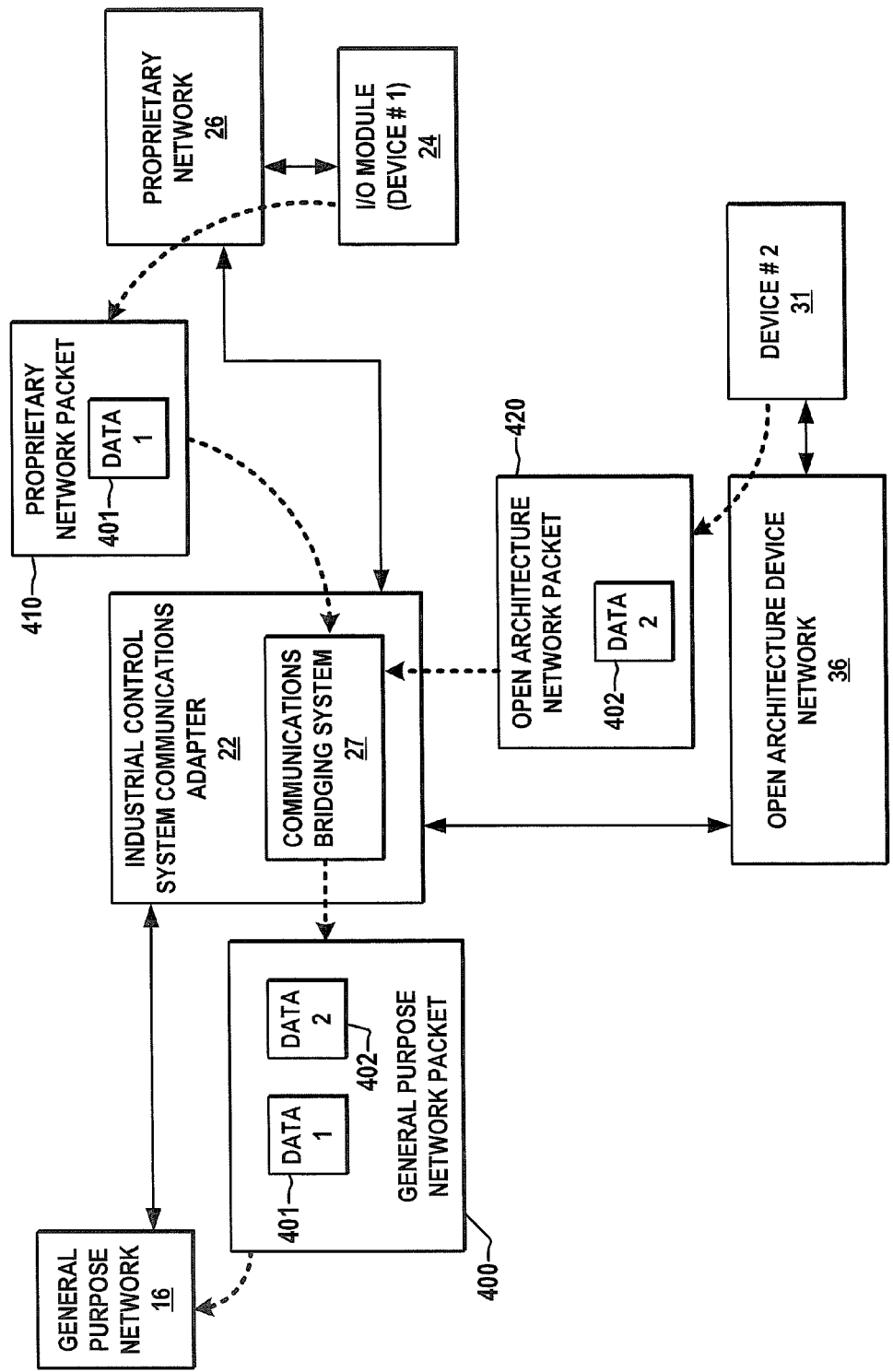
FIG. 7A is a system diagram illustrating further operation of the system of FIGS. 1 and 6A with a communications adapter receiving data from first and second devices connected to the proprietary and open architecture networks and constructing a single general purpose network packet including data from the first and second devices.
Figure 7B:
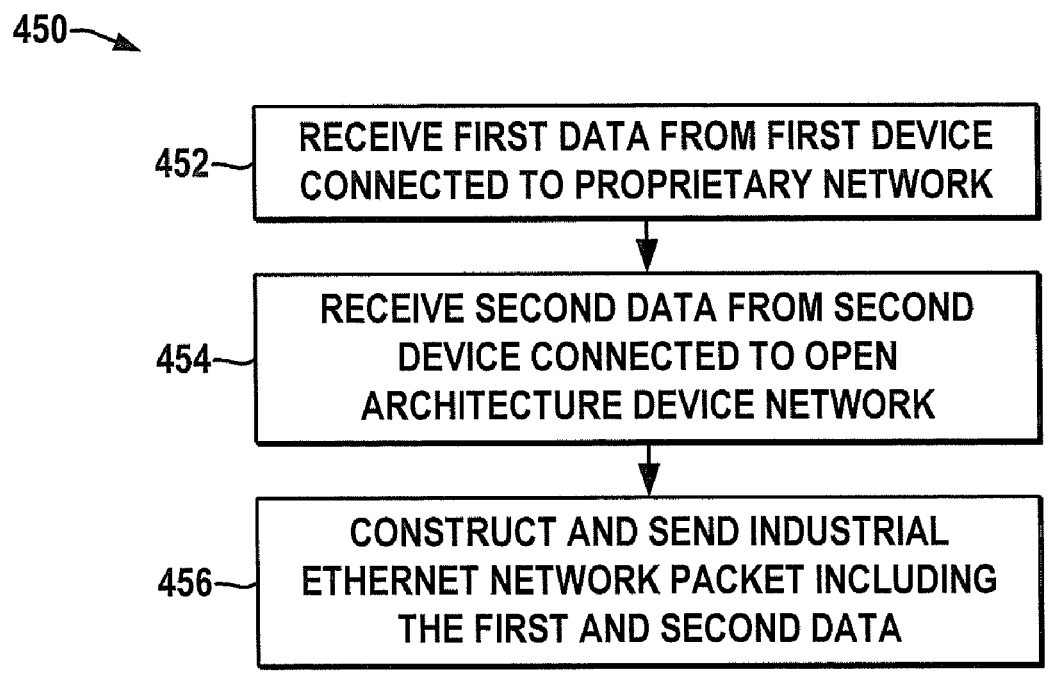
FIG. 7B is a flow diagram illustrating construction of a single packet by the communications adapter module of FIG. 7A for transmission on the general purpose network including with data from two or more devices.

As shown in FIGS. 7A and 7B, moreover, the exemplary communications adapter 22 can assemble data from two or more devices or modules on the networks 26 and/or 36 into a single general purpose network packet. In the example of FIG. 7A, the devices 24 and 31 send first and second pieces of data 301 and 302 in proprietary and open architecture network packets 410 and 420 to the adapter 22 through the networks 26 and 36, respectively. The communications adapter 22 receives the data pieces 401 and 402 from the devices 24 and 31, respectively, and constructs a general purpose network packet 400 including the data 401 and 402. This operation is further illustrated in the flow diagram 450 of FIG. 7B, in which the adapter 22 receives the first data 401 from the first device 24 at 452, and receives the second data 402 from the second device 31 at 454, and then constructs and sends the general purpose industrial network packet 400, including the data 401 and 402, to the desired recipient at 456 via the general purpose industrial network 16. By this exemplary operation, the above described and other embodiments of a communications adapter may be advantageously employed in industrial control systems to facilitate reduction in network traffic associated with data transfer to or from field devices 31 and/or modules 24 and thereby economize the amount of network bandwidth thus utilized, and also to reduce the number of general purpose industrial network connections required for such data transfer.

The above implementations are merely examples of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. An industrial control system communications adapter, comprising:
   a first connection operatively coupleable to a first open architecture network, the first open architecture network being a routable industrial network;
   a second connection operatively coupleable to a proprietary protocol network for communicating with at least one device on the proprietary protocol network;
   a third connection operatively coupleable to a second open architecture network for communicating with at least one device on the second open architecture network wherein the second open architecture network is a Fieldbus network; and
   a bridging system operatively coupled with the first, second, and third connections and providing communications bridging for the first open architecture network, the second open architecture network, and the proprietary protocol network;
   wherein the first connection, the second connection, the third connection, and the bridging system are integrated into a single module that can be coupled with a backplane for communicating with at least one device on the proprietary protocol network.

2. The adapter of claim 1, wherein the first open architecture network is an industrial Ethernet network selected from the group consisting of an EtherNet/IP network, a Modbus-TCP network, a PROFINET IO network, a Foundation Fieldbus High Speed EtherNet network, an EtherNet Powerlink network, and an EtherCAT network.

3. The adapter of claim 1, wherein the open architecture networks are not directly compatible with one another.

4. The adapter of claim 1, wherein the second open architecture network is one of a Foundation Fieldbus network, a Profibus network, a DeviceNet network; an AS-i network, a Modbus network, and a HART network.

5. The adapter of claim 1, wherein the bridging system is operative to adapt at least one outgoing packet according to network type differences between the network to which the outgoing packet is to be sent and a network from which a corresponding incoming packet is received.

6. The adapter of claim 1, wherein the bridging system is operative to adapt at least one outgoing packet according to network protocol differences between the network to which the outgoing packet is to be sent and a network from which a corresponding incoming packet is received.

7. The adapter of claim 1, wherein the bridging system is operative to adapt at least one outgoing packet according to baud rate differences between the network to which the outgoing packet is to be sent and a network from which a corresponding incoming packet is received.

8. The adapter of claim 1, wherein the bridging system is operative to adapt at least one outgoing packet according to data format differences between the network to which the outgoing packet is to be sent and a network from which a corresponding incoming packet is received.

9. The adapter of claim 1, wherein the bridging system provides sequential addressing for devices on the second open architecture network and the proprietary protocol network.

10. The adapter of claim 1, wherein at least one of the open architecture networks supports common industrial protocol (CIP) messaging.

11. The adapter of claim 1, wherein the bridging system is operative to construct and send outgoing packets to the first open architecture network including data from two or more incoming packets received from at least one of the proprietary protocol network and the second open architecture network.

12. The adapter of claim 11, wherein the bridging system is operative to construct and send a plurality of outgoing packets to at least one of the proprietary protocol network and the second open architecture network including data from a single incoming packet received from the first open architecture network.

13. The adapter of claim 1, wherein the bridging system is operative to construct and send a plurality of outgoing packets to at least one of the proprietary protocol network and the second open architecture network including data from a single incoming packet received from the first open architecture network.

14. An industrial control system communications adapter, comprising:
- a first connection operatively coupleable to a first open architecture network, the first open architecture network being an industrial network;
- a second connection operatively coupleable to a proprietary protocol network for communicating with at least one device on the proprietary protocol network;
- a third connection operatively coupleable to a second open architecture network for communicating with at least one device on the second open architecture network, the second open architecture network being a Fieldbus; and
- a bridging system operatively coupled with the first, second, and third connections and providing communications bridging for the first open architecture network, the second open architecture network, and the proprietary protocol network, wherein the proprietary protocol network and the second open architecture network use different addressing mechanisms, and wherein the bridging system provides sequential addressing for devices on the second open architecture network and the proprietary protocol network and assigns addresses to devices on the second open architecture network beginning with a next unused address after the last address of the proprietary protocol network.

15. The adapter of claim 14, wherein the first open architecture network is an industrial Ethernet network selected from the group consisting of an EtherNet/IP network, a Modbus-TCP network, a PROFINET IO network, a Foundation Fieldbus High Speed EtherNet network, an EtherNet Powerlink network, and an EtherCAT network.

16. The adapter of claim 14, wherein the bridging system is operative to adapt at least one outgoing packet according to network type differences between the network to which the outgoing packet is to be sent and a network from which a corresponding incoming packet is received.

17. The adapter of claim 14, wherein the bridging system is operative to adapt at least one outgoing packet according to network protocol differences between the network to which the outgoing packet is to be sent and a network from which a corresponding incoming packet is received.

18. The adapter of claim 14, wherein the bridging system is operative to adapt at least one outgoing packet according to baud rate differences between the network to which the outgoing packet is to be sent and a network from which a corresponding incoming packet is received.

19. The adapter of claim 14, wherein the bridging system is operative to adapt at least one outgoing packet according to data format differences between the network to which the outgoing packet is to be sent and a network from which a corresponding incoming packet is received.

20. The adapter of claim 14, wherein the second open architecture network is one of a Foundation Fieldbus network, a Profibus network, a DeviceNet network; an AS-i network, a Modbus network, and a HART network.

21. The adapter of claim 14, wherein at least one of the open architecture networks supports common industrial protocol (CIP) messaging.

22. The adapter of claim 14, wherein the bridging system is operative to construct and send outgoing packets to the first open architecture network including data from two or more incoming packets received from at least one of the proprietary protocol network and the second open architecture network.

23. The adapter of claim 14, wherein the bridging system is operative to construct and send a plurality of outgoing packets to at least one of the proprietary protocol network and the second open architecture network including data from a single incoming packet received from the first open architecture network.

* * * * *